(12) United States Patent
Hu et al.

(10) Patent No.: US 9,400,418 B2
(45) Date of Patent: Jul. 26, 2016

(54) LIGHT SOURCE MODULE AND PROJECTION APPARATUS

(71) Applicants: Tung-Chou Hu, Hsin-Chu (TW); Li-Wei Tseng, Hsin-Chu (TW)

(72) Inventors: Tung-Chou Hu, Hsin-Chu (TW); Li-Wei Tseng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 92 days.

(21) Appl. No.: 14/458,271

(22) Filed: Aug. 13, 2014

(65) Prior Publication Data

US 2015/0131061 A1     May 14, 2015

(30) Foreign Application Priority Data

Nov. 14, 2013   (CN) ...................... 2013 2 0715264 U

(51) Int. Cl.
*G03B 21/16*   (2006.01)
*G03B 21/20*   (2006.01)

(52) U.S. Cl.
CPC ................ *G03B 21/16* (2013.01); *G03B 21/20* (2013.01)

(58) Field of Classification Search
CPC ........ G03B 21/16; G03B 21/20; G03B 21/18; G03B 21/2026; H04N 9/3141; H04N 9/3144; F21V 29/02; F21V 29/10; F21V 29/15; F21V 29/20
See application file for complete search history.

(56) References Cited

U.S. PATENT DOCUMENTS

| 6,456,012 | B1* | 9/2002 | Kuroda | H04N 9/3141 315/158 |
| 7,140,734 | B2* | 11/2006 | Lim | G03B 21/16 348/748 |
| 7,775,689 | B2 | 8/2010 | Nishimura et al. | |
| 7,922,335 | B2 | 4/2011 | Sakai et al. | |
| 8,172,405 | B2 | 5/2012 | Lo et al. | |
| 2005/0122488 | A1* | 6/2005 | Fernandez | G03B 21/00 353/120 |
| 2006/0232973 | A1 | 10/2006 | Haga et al. | |
| 2007/0247593 | A1* | 10/2007 | Chou | G03B 21/16 353/61 |
| 2008/0170395 | A1 | 7/2008 | Ho | |
| 2009/0040471 | A1* | 2/2009 | Noda | G03B 21/16 353/61 |
| 2011/0032490 | A1* | 2/2011 | Hsiao | G03B 21/16 353/58 |
| 2011/0032491 | A1* | 2/2011 | Tsai | F21V 29/02 353/61 |

* cited by examiner

*Primary Examiner* — Sultan Chowdhury
(74) *Attorney, Agent, or Firm* — Jianq Chyun IP Office

(57) ABSTRACT

A light source module and a projection apparatus including the light source module, an optical engine module, and a projection lens are provided. The light source module includes a lamp holder, a casing, a light source, and a heat dissipation fan. The lamp holder has a cover having a first inlet and a first outlet. The casing is connected to the lamp holder and has a second inlet and at least one second outlet. The light source is fixed to the lamp holder fixed to a housing of the projection apparatus. The heat dissipation fan generates a heat dissipation airflow through an outflow side. A first part of the heat dissipation airflow enters the cover through the first inlet, and leaves the cover through the first outlet. A second part of the heat dissipation airflow enters the casing through the second inlet, and leaves the casing through the second outlet.

14 Claims, 5 Drawing Sheets

LIGHT SOURCE MODULE AND PROJECTION APPARATUS

CROSS-REFERENCE TO RELATED APPLICATION

This application claims the priority benefit of China application serial no. 201320715264.6, filed on Nov. 14, 2013. The entirety of the above-mentioned patent application is hereby incorporated by reference herein and made a part of this specification.

BACKGROUND

1. Technical Field

The invention relates to an optical device and a photoelectric apparatus. Particularly, the invention relates to a light source module and a projection apparatus.

2. Related Art

A projection apparatus is a display apparatus capable of displaying images at any time anywhere. An imaging principle of the projection apparatus is to convert an illumination beam generated by a light source into an image beam through a light valve, and project the image beam onto a screen or a wall through a lens to form an image. Along with development of projection technology and reduction of manufacturing cost, usage of the projection apparatus has gradually extended from commercial use to family use.

In the projection apparatus, a plastic base is generally fixed on a casing of an optical engine, and a light source module is assembled to the plastic base to implement configuration of the light source module. However, configuration of the plastic base increases a manufacturing cost of the projection apparatus. Moreover, a heat dissipation fan is generally used in the projection apparatus to provide a heat dissipation airflow to the light source module to achieve a heat dissipation effect. A light-shielding casing of the light source module resists the heat dissipation airflow, and if a rotating speed of the heat dissipation fan is increased to overcome the resistance, the noise of the heat dissipation fan is too large. In order to decrease the resistance to the heat dissipation airflow caused by the light-shielding casing of the light source module, the light-shielding casing of some light source modules is designed to have a step shape or an arc shape to guide the heat dissipation airflow. However, such method also increases the manufacturing cost of the projection apparatus and increases fabrication difficulty of the light-shielding casing. Moreover, the high heat generated by the light source when the light source emits light probably leads to an excessively high temperature of the heat dissipation airflow to cause overheat or even melting of the casing of the projection apparatus.

U.S. Patent No. 20060232973 discloses a light source apparatus, in which a lightbox has a plurality of openings, and a reflection cover of a bulb has an inlet and an outlet. U.S. Pat. No. 8,172,405 discloses a light source apparatus, in which a light source thereof has an inlet and an outlet. U.S. Pat. No. 7,922,335 discloses a light source apparatus including a bulb, a mirror and a square casing. U.S. Pat. No. 7,775,689 discloses a projector, in which a light source has a mirror, a mirror supporting member and a screw hole. U.S. Patent No. 20080170395 discloses a dual lamp module having a handle. However, the above patents still require amelioration in heat dissipation and design.

SUMMARY

The invention is directed to a light source module and a projection apparatus for decreasing a resistance to a heat dissipation airflow caused by a casing to save the manufacturing cost.

Other objects and advantages of the invention can be further illustrated by the technical features broadly embodied and described as follows.

In order to achieve one or a portion of or all of the objects or other objects, an embodiment of the invention provides a light source module adapted to a projection apparatus. The projection apparatus has a housing. The light source module includes a lamp holder, a casing, a light source, and a heat dissipation fan. The lamp holder is fixed to the housing and has a cover. The cover has a first inlet and a first outlet. The casing is connected to the lamp holder and has a containing space, a second inlet, and at least one second outlet. The containing space is located between the second inlet and the second outlet. The light source is fixed to the lamp holder. The containing space contains the light source. The heat dissipation fan has an outflow side. The first inlet and the second inlet face the outflow side. The heat dissipation fan generates a heat dissipation airflow through the outflow side. A first part of the heat dissipation airflow enters the cover through the first inlet, and leaves the cover through the first outlet. A second part of the heat dissipation airflow enters the casing through the second inlet, and leaves the casing through the second outlet.

In order to achieve one or a portion of or all of the objects or other objects, an embodiment of the invention provides a projection apparatus including an optical engine module, a light source module, and a projection lens. The projection apparatus has a housing. The light source module is configured for providing an illumination beam and includes a lamp holder, a casing, a light source, and a heat dissipation fan. The lamp holder is fixed to the housing and has a cover. The cover has a first inlet and a first outlet. The casing is connected to the lamp holder and has a containing space, a second inlet, and at least one second outlet. The containing space is located between the second inlet and the second outlet. The light source is fixed to the lamp holder. The containing space contains the light source. The heat dissipation fan has an outflow side. The first inlet and the second inlet face the outflow side. The heat dissipation fan generates a heat dissipation airflow through the outflow side. A first part of the heat dissipation airflow enters the cover through the first inlet, and leaves the cover through the first outlet. A second part of the heat dissipation airflow enters the casing through the second inlet, and leaves the casing through the second outlet. The optical engine module is configured for receiving the illumination beam from the light source module, and converting the illumination beam into an image beam. The projection lens converts the image beam into a projection beam.

According to the above descriptions, the embodiments of the invention have at least one of the following effects. In the embodiments of the invention, the lamp holder of the light source module in the projection apparatus may be directly fixed to the housing without being assembled by using an additional plastic base, so that the manufacturing cost is saved. Moreover, the light source module has the first outlet formed on the cover, and also has a second outlet formed on the casing. In this way, after the heat dissipation airflow generated by the heat dissipation fan enters the cover and the casing respectively through the first inlet of the cover and the second inlet of the casing, the heat dissipation airflow may be exhausted through the first outlet of the cover and may also be exhausted through the second outlet of the casing, so as to decrease the resistance to the heat dissipation airflow caused by the casing. Accordingly, it is unnecessary to design the casing into a step shape or an arc shape in order to decrease the resistance to the heat dissipation airflow caused by the casing of the light source module, so that the manufacturing cost may further be saved, and fabrication difficulty of the casing may be decreased.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
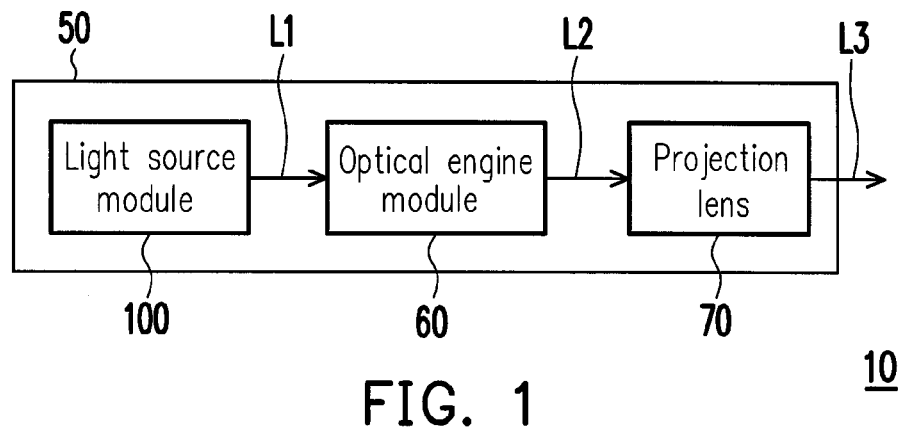
FIG. 1 is a block diagram of a projection apparatus according to an embodiment of the invention.

Referring to FIG. 1, the projection apparatus 10 includes an optical engine module 60, a light source module 100, and a projection lens 70. In detail, in the embodiment, the light source module 100 is configured for providing an illumination beam L1, the optical engine module 60 is configured for receiving the illumination L1 beam from the light source module 100 and converting the illumination beam L1 into an image beam L2, and the projection lens 70 is configured for converting the image beam L2 into a projection beam L3. Details of the light source module 100 of the embodiment are described below.

Figure 2:
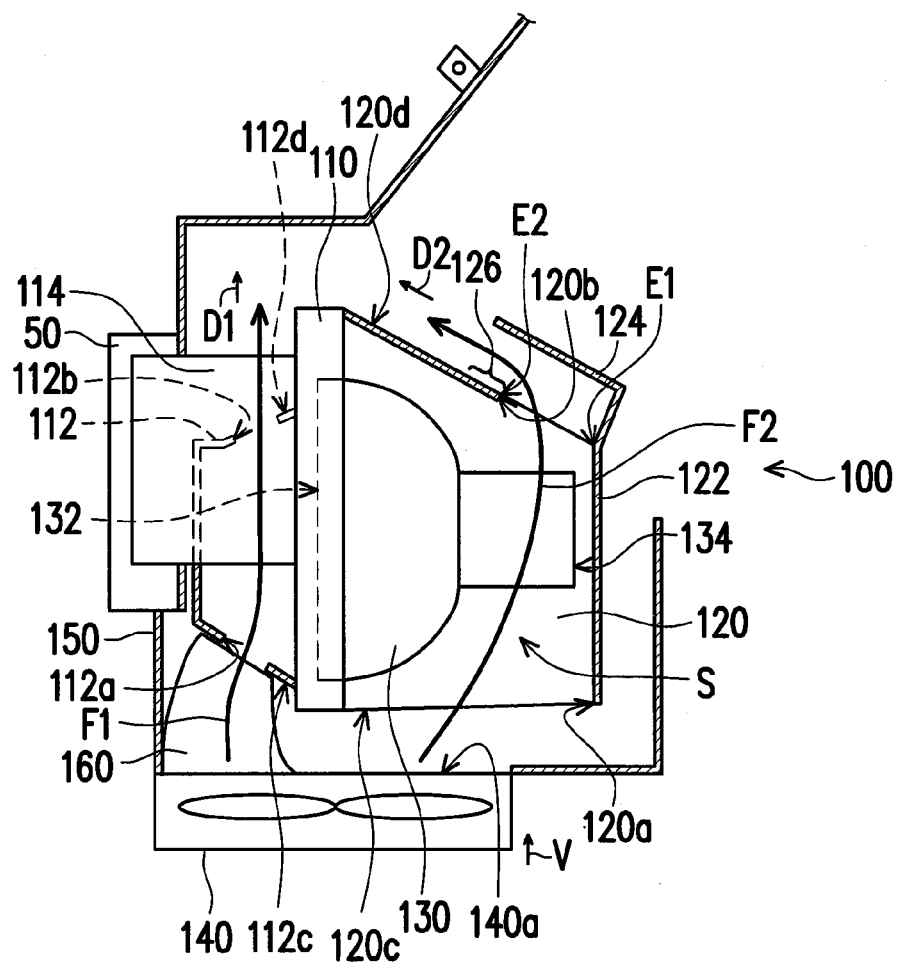
FIG. 2 is a top view of a light source module according to an embodiment of the invention.
Figure 3:
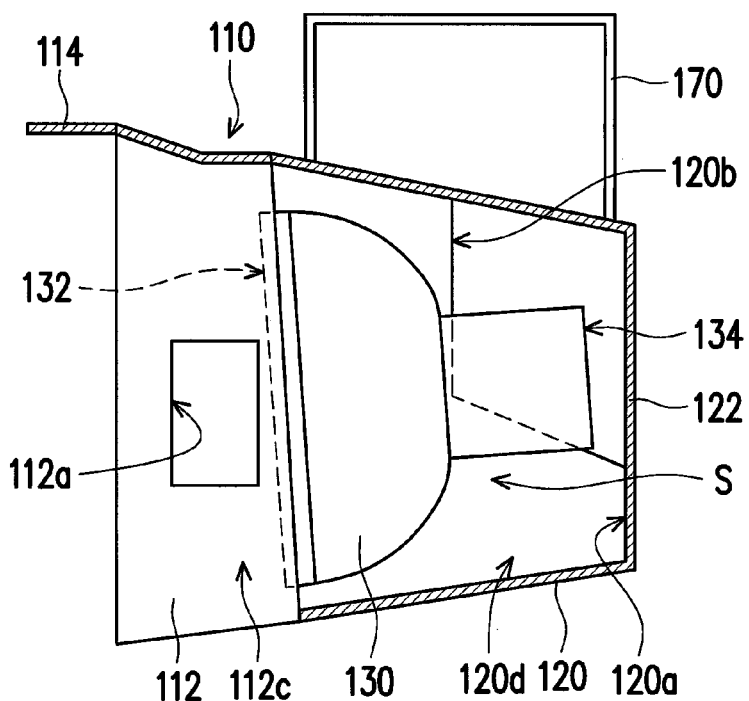
FIG. 3 is a side view of a part of structure of the light source module of FIG. 2 along a viewing angle V.

Referring to FIG. 2 and FIG. 3, the light source module 100 of the embodiment is applied to the projection apparatus 10, and the projection apparatus 10 has a housing 50, wherein the housing 50 may include an outer casing of the projection apparatus 10 or any casing in internal of the projection apparatus 10 used for configuring optical devices. The light source module 100 includes a lamp holder 110, a casing 120, a light source 130, and a heat dissipation fan 140. The lamp holder 110 is fixed to the housing 50 and has a cover 112. The cover 112 has a first inlet 112a and a first outlet 112b. The casing 120 is connected to the lamp holder 110 and has a containing space S, a second inlet 120a, and at least one second outlet 120b. The containing space S is located between the second inlet 120a and the second outlet 120b. The light source 130 is, for example, high-pressure mercury lamp and is fixed to the lamp holder 110. The containing space S contains the light source 130. The light source 130 has a light-emitting end 132 and a back end 134 opposite to the light-emitting end 130, and the light-emitting end 132 faces the cover 112. The light source 130 emits the illumination beam L1 (shown in FIG. 1) through the light-emitting end 132, and the illumination beam L1 emits out through the cover 112 for providing light for the projection apparatus 10 during imaging.

The heat dissipation fan 140 is disposed at a side of the lamp holder 110 and has an outflow side 140a. The outflow side 140a of the heat dissipation fan 140 faces the first inlet 112a and the second inlet 120a. The heat dissipation fan 140 is configured for generating a heat dissipation airflow through the outflow side 140a. A first part F1 of the heat dissipation airflow enters the cover 112 through the first inlet 112a and leaves the cover 112 through the first outlet 112b for dissipating heat of the internal of the light source 130, a second part F2 of the heat dissipation airflow enters the casing 120 through the second inlet 120a and leaves the casing 120 through the second outlet 120b for dissipating heat of the external of the light source 130, so as to decrease a whole temperature of the light source 130 to enhance a light-emitting efficiency of the light source 130.

According to the above configuration, the lamp holder 110 of the light source module 100 may be directly fixed to the housing 50 without being assembled by using an additional plastic base, so that the manufacturing cost may be saved. Moreover, the light source module 100 has the first outlet 112b formed on the cover 112, and further has a second outlet 120b formed on the casing 120. In this way, after the heat dissipation airflow generated by the heat dissipation fan 140 enters the cover 112 and the casing 120 respectively through the first inlet 112a of the cover 112 and the second inlet 120a of the casing 120, the heat dissipation airflow may be exhausted through the first outlet 112b of the cover 112 and may also be exhausted through the second outlet 120b of the casing 120, so as to decrease the resistance to the heat dissipation airflow caused by the casing 120. Accordingly, it is unnecessary to design the casing 120 into a step shape or an arc shape in order to decrease the resistance to the heat dissipation airflow caused by the casing 120 of the light source module 100, so that the manufacturing cost is further saved, and fabrication difficulty of the casing 120 may be decreased.

The lamp holder 110 of the embodiment is directly fixed to the housing 50 through an assembling part 114 without being assembled by using an additional plastic base, wherein the assembling part 114 is, for example, assembled to the housing 50 through screw-locking. Moreover, the light source module 100 further includes a frame 150, wherein the frame 150 is fixed to the housing 50, and the heat dissipation fan 140 is fixed to the frame 150. In other embodiments, the assembling part 114 of the lamp holder 110 may be assembled to the housing 50 through riveting, engaging or other suitable methods, and the frame 150 may be assembled to the housing 50 through riveting, engaging or other suitable methods, which is not limited by the invention.

In the embodiment, the casing 120 has a shielding wall 122, the back end 134 of the light source 130 faces the shielding wall 122 and is shielded by the shielding wall 122. In this way, the light emitted by the light source 130 propagating out of the casing 120 from the back end 134 may be avoided, and it is unnecessary to add a light-shielding member to the casing 120 in order to shield the light at the back end 134 of the light source 130, such that a component design and a manufacturing process may be further simplified to save the manufacturing cost.

As that shown in FIG. 2, the cover 112 of the embodiment has a first side 112c and a second side 112d opposite to the first side 112c. The first side 112c faces the outflow side 140a of the heat dissipation fan 140, the first inlet 112a is formed at the first side 112c, and the first outlet 112b is formed at the second side 112d. The light source module 100 further includes an air-guiding structure 160 disposed between the outflow side 140a of the heat dissipation fan 140 and the first inlet 112a of the cover 112. The first part F1 of the heat dissipation airflow is guided by the air-guiding structure 160 and enters the cover 112 through the first inlet 112a, and leaves the cover 112 through the first outlet 112b along a first direction D1.

The casing 120 of the embodiment has a third side 120c and a fourth side 120d opposite to the third side 120c. The third side 120c faces the outflow side 140a of the heat dissipation fan 140, the second inlet 120a is formed at the third side 120c, and the second outlet 120b is formed at the fourth side 120d. Moreover, the casing 120 has a shielding part 124, and the second outlet 120b has a first edge E1 and a second edge E2 opposite to the first edge E1. The shielding part 124 extends out from the first edge E1 and overlaps a portion 126 of the casing 120, and the portion 126 of the casing 120 is adjacent to the second edge E2. In this way, the second outlet 120b is shielded by the shielding part 124, such that the partial illumination beam L1 (shown in FIG. 1) scattered from the light source 130 propagating to external of the casing 120 through the second outlet 120b to cause light leakage and influence the quality of the images viewed by the user may be avoided, wherein the shielding part 124 is, for example, set along a direction perpendicular to a normal direction of the second outlet 120b. Further, the second part F2 of the heat dissipation airflow is guided by the shielding part 124 and leaves the casing 120 along a second direction D2, wherein the first direction D1 is intersected to the second direction D2. In this way, the high temperature heat dissipation airflow (i.e. the first part F1 of the heat dissipation airflow) flowing through the light-emitting end 132 of the light source 130 and the low temperature heat dissipation airflow (i.e. the second part F2 of the heat dissipation airflow) flowing through the back end 134 of the light source 130 are blended and are then exhausted out of the projection apparatus, so that the casing 120 of the projection apparatus 10 with over-high temperature or even being melting due to the heat dissipation airflow with over-high temperature may be avoided.

Figure 4:
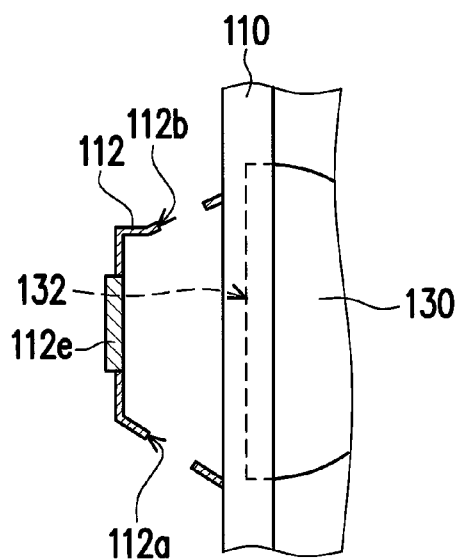
FIG. 4 is a partial enlarged view of a lamp holder of FIG. 2.

Referring to FIG. 4, the cover 112 of the embodiment has a filter 112e, and the light-emitting end 132 of the light source 130 faces the filter 112e. The filter 112e may filter invisible lights emitted by the light source 130 to decrease the temperature of the light emitted by the light source 130, so that the structure of the projection apparatus damaged by the light with over-high temperature is avoided.

However, in order to facilitate disassembly of the light source module 100 for users, the light source module 100 of the embodiment further includes a handle 170 as that shown in FIG. 3. In the embodiment, the handle 170 is connected to the casing 120, and the user may hold the handle 170 to disassemble the light source module 100.

Figure 5:
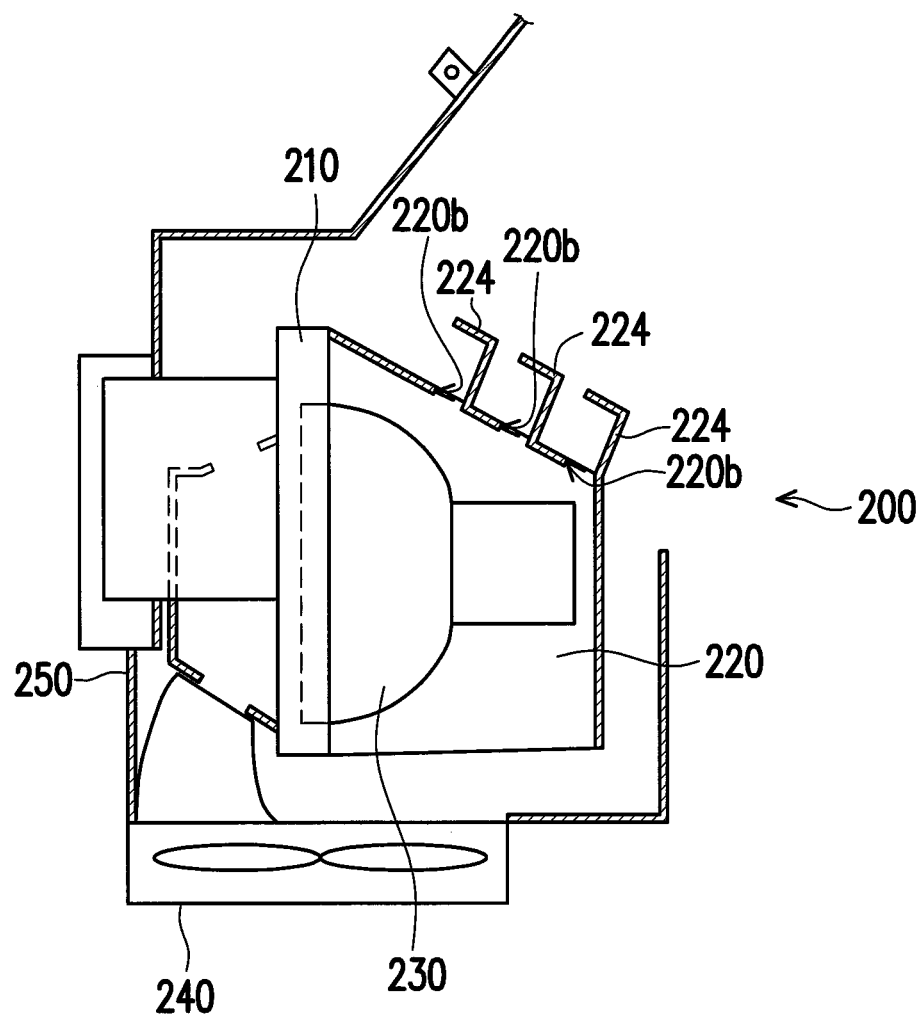
FIG. 5 is a top view of a light source module according to another embodiment of the invention.

In the light source module 200 of FIG. 5, configurations and functions of a lamp holder 210, a casing 220, a light source 230, a heat dissipation fan 240, and a frame 250 are similar to that of the lamp holder 110, the casing 120, the light source 130, the heat dissipation fan 140, and the frame 150 of FIG. 2, which are not repeated. A main difference between the light source module 200 and the light source module 100 is that the numbers of the second outlets 220b and the shielding parts 224 of the casing 220 are plural (three second outlets 220b and shielding parts 224 are illustrated for example), so as to further decease the resistance to the heat dissipation airflow caused by the casing 220. In other embodiments, the casing may have other suitable numbers of the second outlets and the shielding parts, which is not limited by the invention.

Figure 6:
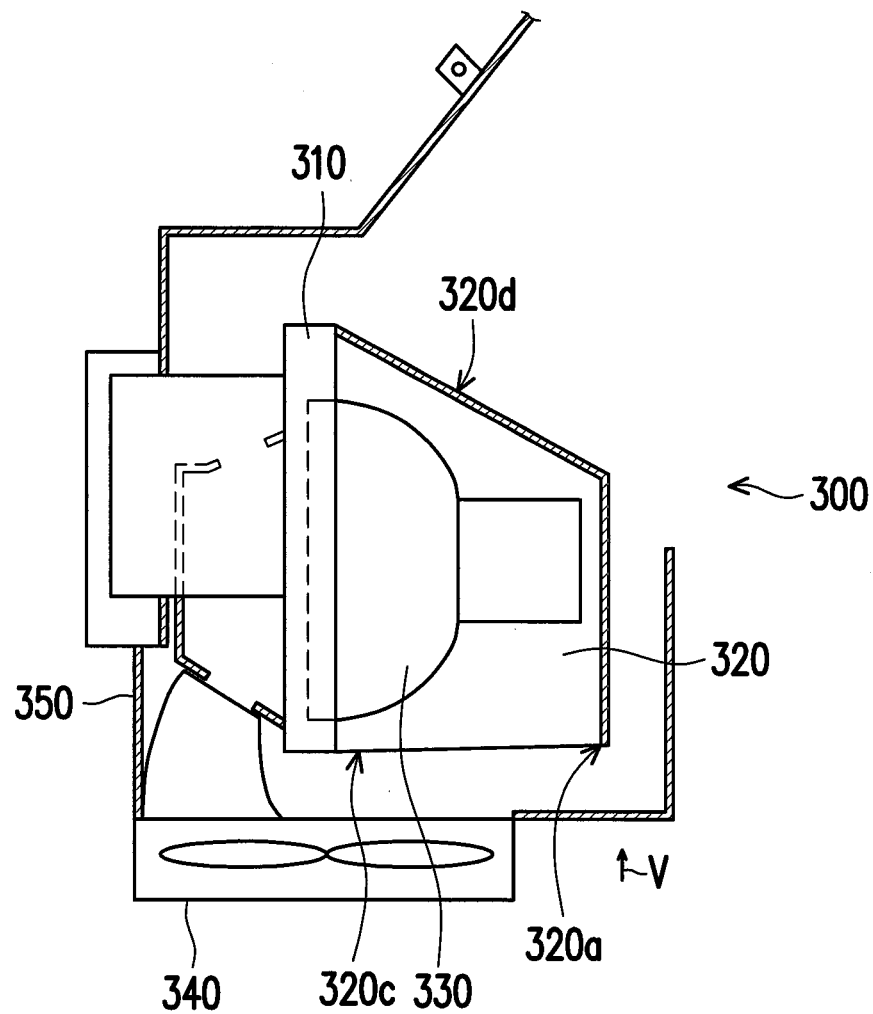
FIG. 6 is a top view of a light source module according to another embodiment of the invention.
Figure 7:
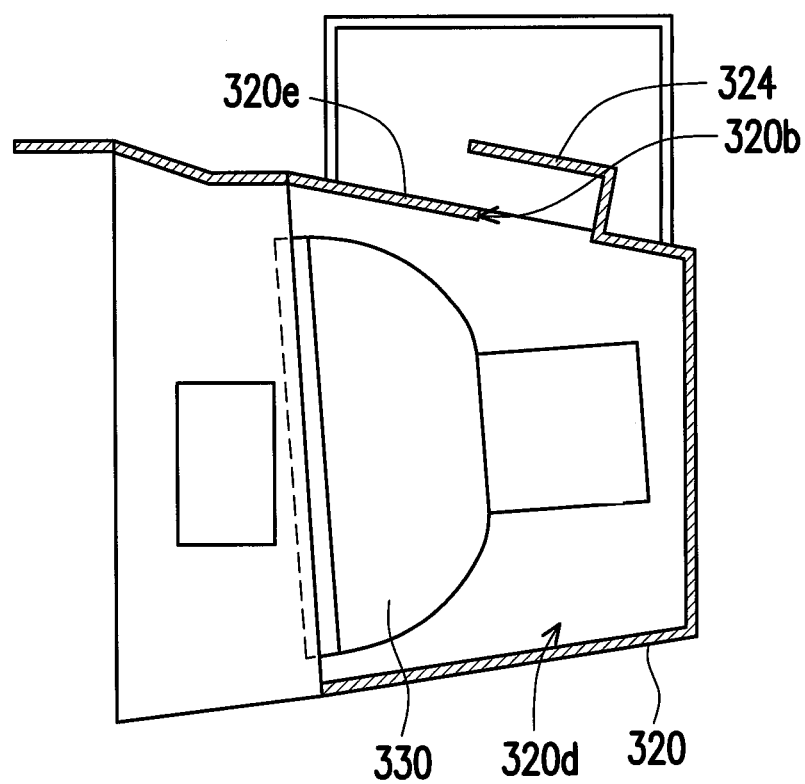
FIG. 7 is a side view of a part of structure of the light source module of FIG. 6 along a viewing angle V.

In the light source module 300 of FIG. 6 and FIG. 7, configurations and functions of a lamp holder 310, a casing 320, a second inlet 320a, a third side 320c, a fourth side 320d, a light source 330, a heat dissipation fan 340, and a frame 350 are similar to that of the lamp holder 110, the casing 120, the second inlet 120a, the third side 120c, the fourth side 120d, the light source 130, the heat dissipation fan 140, and the frame 150 of FIG. 2, which are not repeated. A main difference between the light source module 300 and the light source module 100 is that a second outlet 320b and a shielding part 324 are formed on a top wall 320e of the casing 320, wherein the top wall 320e is connected between the third side 320c and the fourth side 320d. In other embodiments, the second outlet may be formed at other suitable positions of the casing, which is not limited by the invention.

In summary, the embodiments of the invention have at least one of the following effects. In the embodiments of the invention, the lamp holder of the light source module may be directly fixed to the housing without being assembled by using an additional plastic base, so that the manufacturing cost may be saved. Moreover, the light source module has the first outlet formed on the cover, and also has a second outlet formed on the casing. In this way, after the heat dissipation airflow generated by the heat dissipation fan enters the cover and the casing respectively through the first inlet of the cover and the second inlet of the casing, the heat dissipation airflow may exhausted through the first outlet of the cover and may also be exhausted through the second outlet of the casing, so as to decrease the resistance to the heat dissipation airflow caused by the casing. Accordingly, it is unnecessary to design the casing into a step shape or an arc shape in order to decrease the resistance to the heat dissipation airflow caused by the casing of the light source module, so that the manufacturing cost may further be saved and fabrication difficulty of the casing may be decreased. Moreover, in an embodiment, the heat dissipation airflow leaving the casing through the second outlet may be blended with the heat dissipation airflow leaving the cover through the first outlet by guidance of the shielding part of the casing. Thus, the high temperature heat dissipation airflow flowing through the light-emitting end of the light source and the low temperature heat dissipation airflow flowing through the back end of the light source are blended and are then exhausted out of the projection apparatus, so that the casing of the projection apparatus with over-high temperature or even being melting due to the heat dissipation airflow with over-high temperature may be avoided.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module, adapted to a projection apparatus, wherein the projection apparatus has a housing, the light source module comprising:
   a lamp holder, fixed to the housing and having a cover, wherein the cover has a first inlet and a first outlet;
   a casing, connected to the lamp holder and having a containing space, a second inlet, and at least one second outlet, wherein the containing space is located between the second inlet and the second outlet, the casing further has a shielding part, and the shielding part extends from a first edge of the second outlet and shields the second outlet;
   a light source, fixed to the lamp holder, wherein the containing space contains the light source; and
   a heat dissipation fan, having an outflow side, wherein the first inlet and the second inlet face the outflow side, the heat dissipation fan generates a heat dissipation airflow through the outflow side, a first part of the heat dissipation airflow enters the cover through the first inlet and leaves the cover through the first outlet, and a second part of the heat dissipation airflow enters the casing through the second inlet and leaves the casing through the second outlet.

2. The light source module as claimed in claim 1, wherein the light source has a light-emitting end and a back end opposite to the light-emitting end, and the light-emitting end faces the cover.

3. The light source module as claimed in claim 2, wherein the casing further has a shielding wall, and the back end faces the shielding wall and is shielded by the shielding wall.

4. The light source module as claimed in claim 1, further comprising a frame, wherein the frame is fixed to the housing, and the heat dissipation fan is fixed to the frame.

5. The light source module as claimed in claim 1, further comprising an air-guiding structure disposed between the outflow side and the first inlet.

6. The light source module as claimed in claim 1, wherein the cover further has a first side and a second side opposite to the first side, the first side faces the outflow side, the first inlet is formed at the first side, and the first outlet is formed at the second side.

7. The light source module as claimed in claim 1, wherein the casing further has a third side and a fourth side opposite to the third side, the third side faces the outflow side, the second inlet is formed at the third side, and the second outlet is formed at the fourth side.

8. The light source module as claimed in claim 1, wherein the casing further has a third side, a fourth side, and a top wall, the third side faces the outflow side and is opposite to the fourth side, the top wall is connected between the third side and the fourth side, the second inlet is formed at the third side, and the second outlet is formed on the top wall.

9. The light source module as claimed in claim 1, wherein the second outlet has a second edge, the second edge is opposite to the first edge, the shielding part overlaps a portion of the casing, and the portion of the casing is adjacent to the second edge.

10. The light source module as claimed in claim 1, wherein the first part of the heat dissipation airflow leaves the cover along a first direction, the second part of the heat dissipation airflow leaves the casing along a second direction through guidance of the shielding part, and the first direction is intersected to the second direction.

11. The light source module as claimed in claim 1, wherein a number of the second outlets is plural.

12. The light source module as claimed in claim 1, further comprising a handle, wherein the handle is connected to the casing.

13. The light source module as claimed in claim 1, wherein the cover further has a filter, the light source has a light-emitting end, and the light-emitting end faces the filter.

14. A projection apparatus, having a housing, the projection apparatus comprising:
   a light source module configured for providing an illumination beam, the light source module comprises:

a lamp holder, fixed to the housing and having a cover, wherein the cover has a first inlet and a first outlet;

a casing, connected to the lamp holder and having a containing space, a second inlet, and at least one second outlet, wherein the containing space is located between the second inlet and the second outlet, the casing further has a shielding part, and the shielding part extends from a first edge of the second outlet and shields the second outlet;

a light source, fixed to the lamp holder, wherein the containing space contains the light source; and a heat dissipation fan, having an outflow side, wherein the first inlet and the second inlet face the outflow side, the heat dissipation fan generates a heat dissipation airflow through the outflow side, a first part of the heat dissipation airflow enters the cover through the first inlet and leaves the cover through the first outlet, and a second part of the heat dissipation airflow enters the casing through the second inlet and leaves the casing through the second outlet;

an optical engine module configured for receiving the illumination beam from the light source module, and converting the illumination beam into an image beam; and a projection lens configured for converting the image beam into a projection beam.

* * * * *